Oct. 15, 1929.  G. JOHNSON  1,731,667
METHOD OF MAKING AND ATTACHING FASTENER ELEMENTS
Filed Jan. 27, 1928
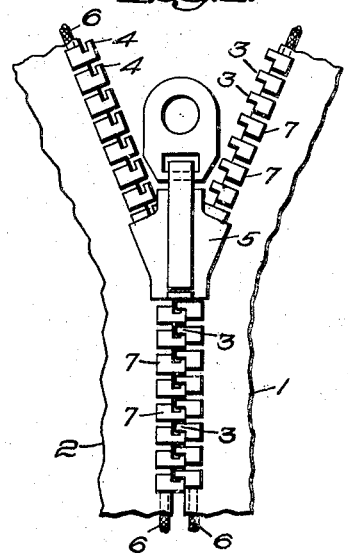
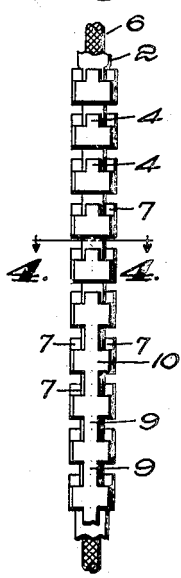
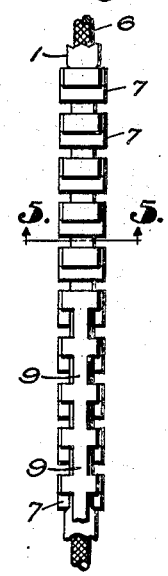
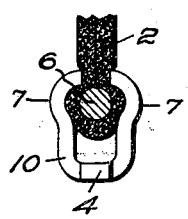
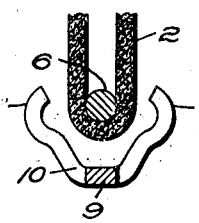
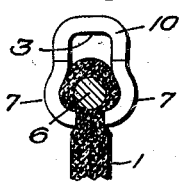
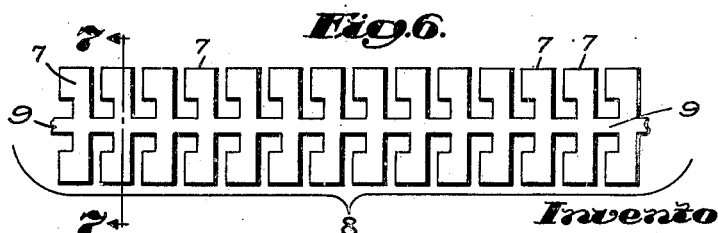
Inventor:
Gustav Johnson
by Emery, Booth, Janney & Varney
Attys Patented Oct. 15, 1929

1,731,667

UNITED STATES PATENT OFFICE

GUSTAV JOHNSON, OF WEST ROXBURY, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

METHOD OF MAKING AND ATTACHING FASTENER ELEMENTS

Application filed January 27, 1928. Serial No. 249,851.

My invention aims to provide improvements in the method of making and attaching a series of fastener elements to a stringer or tape.

In the drawings, which illustrate a preferred embodiment of the invention:—

Figure 1 is a view showing a portion of each of two stringers located at the opening in a part to be closed by the fastener elements secured to the edges of the stringers and also a slider for connecting and disconnecting the fastener elements;

Fig. 2 is an edge view of a stringer carrying stud or hook members of the fastener elements, and showing the method of severing the connecting portions to make the stud or hook members after the fastener members have been attached in a strip to one edge of the stringer;

Fig. 3 is a view similar to Fig. 2, but showing sockets or eyelets and the method of attaching and securing the same;

Fig. 4 is a cross-section taken on the line 4—4 of Fig. 2 showing only a portion of the stringer in cross-section;

Fig. 5 is a section on the line 5—5 of Fig. 3;

Fig. 6 is a plan of a portion of a strip of the fastening elements before they are attached and showing how they are connected;

Fig. 7 is a cross-section on the line 7—7 of Fig. 6 showing the curved attaching portions; and Fig. 8 is a section showing a stringer with the strip bent up and about to be clamped to the stringer.

Referring to the embodiment of my invention shown by the drawings, I have illustrated fastening means particularly adapted for various articles having an opening which must be opened and closed. For this purpose, I have shown (Fig. 1) two stringers 1 and 2 of suitable material to be attached to the article which is to be provided with the fastening means. The stringer 1, shown at the right of Fig. 1, is provided, along one edge, with a series of sockets or eyes 3 more fully hereinafter described. The stringer 2 at the left of the figure is provided with a series of studs or hooks 4 constructed as hereinafter described.

A suitable slider 5, constructed to engage the fastening elements 3 and 4 and to slide relative thereto, for engaging and disengaging the fastener elements is indicated in a general way in Fig. 1. The construction and operation of a slider for this purpose is so well-known to those skilled in the art as to make it unnecessary to go into further detail in connection therewith.

The stringers 1 and 2 may be of any suitable construction but, for the purposes of illustration, I have shown them as being made of flexible material which is doubled (Figs. 4 and 5) to provide a rounded edge to which the fastener elements are secured. A cord 6 is inserted at the rounded edge so as to form a bead to cooperate with the attaching portions 7 of the fastening elements to prevent the fastening elements from being pulled loose when under lateral stresses.

Any suitable machine may be used to form the strip 8 of fastening elements, shown in Fig. 6, therefore, it is unnecessary to go into detail in illustrating and describing a machine for this purpose. It will be readily understood, by persons skilled in the art, that, by passing a strip of metal, between suitable dies, portions of the strip 8 may be cut out along each edge, as indicated in Fig. 6.

The strip 8, shown in Fig. 6, is provided, along its longitudinal edges, with the attaching portions 7, and between the attaching portions 7 are the fastener portions and the connecting portions 9. It should be understood that the strip 8 may be made into either a series of socket or eye-shaped elements 3 or a series of studs or hooks 4 as desired depending upon how much of the connecting portions 9 is removed.

The strip 8 may be formed and attached in any suitable manner but for the purposes of illustration I have shown (Fig. 7) the attaching portions 7 as being first curved in cross-section to fit the curve of the beaded portion of a stringer. The strip is thereafter pressed into the form shown in Fig. 8 and it is only necessary to press the attaching portions 7 against opposite sides of a stringer at one edge to secure it firmly thereto, as shown in Figs. 4 and 5. When a strip 8 is attached to a stringer the fastening portions extend from one edge in the form of loops 10 (Figs. 4 and 5) to provide the eyes 3 or to support the hooks 4 as the case may be.

The object of forming the fastener elements in strips is to provide for accurate spacing of the fastener elements upon the part which carries them so that they will make positive engagement with cooperating fastener elements with the least possible amount of effort when the slider 5 is moved along the two rows of fastener elements. This method of attachment is also very simple and the fastener elements are very easy to handle when provided in strips.

Another important reason for providing the fastener elements in strips, when formed as illustrated and described, is that a strip may be made into a series of separate sockets or eyes or studs or hooks as desired. By cutting away all of each of the connecting portions 9, as shown in Figs. 3 and 5, a series of sockets or eyes 3 is provided. If, however, as shown in Figs. 2 and 4, a portion of each of the connecting portions 9 is left so that it extends from the loop 10, a series of studs or hooks 4 is provided for cooperative engagement with the loops 3. (Note that in Figs. 2 and 3 some of the fastener elements have been cut apart while the others remain in strip form to illustrate my method of attaching the fasteners in strip form and then cutting them apart so that they may be free to act independently of each other.) Any suitable mechanism may be used to sever the connecting portions 9 and they may be cut apart by hand or automatically by machine, as by sawing, milling or punching.

I am aware that my invention may be embodied in forms other than that shown and described without departing from the scope of my invention and, therefore, reference is made to the following claims to indicate the scope of my invention.

Claims:

1. The method of making fastener elements adapted to be secured to a stringer which comprises forming the fastener elements in a strip with connecting means between each fastener element, fastening the strip to a stringer and then severing the connecting means to provide a series of independent fastener elements which may be engaged with cooperating fastener elements on another stringer.

2. The method of making fastener elements adapted to be secured to a stringer which comprises forming the fastener elements in a flat strip with connecting means between each fastener element bending the strip to form a series of loops, attaching the bent strip to one edge of a stringer and then cutting the fastener elements apart at the connecting means to provide a series of independent fastener elements which may be free to cooperate with other fastener elements on another stringer.

3. The method of making a fastening device including a stringer and a series of uniformly spaced fastening elements attached to the stringer which comprises pressing the fastener elements from a strip of metal, leaving connecting portions between the fastener elements so that they may be attached to the stringer in a strip to secure uniform spacing, bending the strip and attaching it to one edge of the stringer and then severing the connecting portions to provide a series of independent fastener elements which may yield with the stringer for engagement with cooperating fastener elements carried by another stringer.

4. The method of making a fastening device including a stringer and a series of uniformly spaced fastening elements attached to the stringer which comprises pressing the fastener elements from a strip of metal, leaving connecting portions between the fastener elements so that they may be attached to the stringer in a strip to secure uniform spacing, bending the strip and attaching it to one edge of the stringer and then cutting away a portion of or all of each connecting portion to provide for a series of eye-shaped fastening elements or hook-shaped fastening elements as desired.

5. The method of making a fastening device including a stringer and a series of uniformly spaced fastening elements attached to the stringer which comprises pressing the fastener elements from a strip of metal, leaving connecting portions between the fastener elements so that they may be attached to the stringer in a strip to secure uniform spacing, bending the strip and attaching it to one edge of the stringer and then cutting away all of each of the connecting portions to provide a series of spaced eyes.

6. The method of making a fastening device including a stringer and a series of uniformly spaced fastening elements attached to the stringer which comprises pressing the fastener elements from a strip of metal, leaving connecting portions between the fastener elements so that they may be attached to the stringer in a strip to secure uniform spacing, bending the strip and attaching it to one edge of the stringer and then cutting away a portion of each of the connecting portions and leaving a portion of each to provide a series of hooks.

7. The method of making fastening means including a stringer and a series of spaced fastening elements, the fastening elements having attaching portions and fastener-engaging portions which comprises providing the fastening elements in a strip provided with connecting portions between the fastener-engaging portions, securing the strip to one edge of the stringer and severing the strip at the connecting portions.

8. The method of making fastening means including a stringer and a series of spaced fastening elements, the fastening elements having attaching portions and fastener-engaging portions, which comprises pressing a strip of metal to provide fastening portions at the center, attaching portions at the sides and connecting portions between the fastening portions, attaching the pressed strip to one edge of the stringer and then cutting the fastening portions apart at the connecting portions.

9. The method of making and attaching a series of fastener elements to a stringer which comprises forming the fastener elements in a strip 8, bending and attaching the strip to the stringer by means of the attaching portions 7 and then cutting away all or portions of connecting means 9 which hold the fastener elements together prior to and while being attached to a stringer.

10. A blank having a series of fastener elements for attachment to a stringer, said blank having attaching means at its opposite edges for securing the blank to one edge of a stringer, means along the center of the blank adapted to provide fastening elements for cooperation with other fastening elements and connecting means normally holding all of the fastening elements together but being removable to separate the fastening elements after the blank has been attached to a stringer.

In testimony whereof, I have signed my name to this specification.

GUSTAV JOHNSON.